(12) United States Patent
Santiago et al.

(10) Patent No.: US 8,397,424 B2
(45) Date of Patent: Mar. 19, 2013

(54) FISHING POLE HOLDER

(76) Inventors: Anthony Santiago, Delmar, NY (US);
Florence A. Santiago, Delmar, NY (US)

( * ) Notice: Subject to any disclaimer, the term of this patent is extended or adjusted under 35 U.S.C. 154(b) by 831 days.

(21) Appl. No.: 12/171,548

(22) Filed: Jul. 11, 2008

(65) Prior Publication Data
US 2010/0005701 A1    Jan. 14, 2010

(51) Int. Cl.
*A01K 97/00* (2006.01)
(52) U.S. Cl. ........................................ 43/21.2
(58) Field of Classification Search ............. 43/21.2; 248/530
See application file for complete search history.

(56) References Cited

U.S. PATENT DOCUMENTS

| | | | |
|---|---|---|---|
| 2,724,569 A * | 11/1955 | Licata | 43/21.2 |
| 2,861,761 A * | 11/1958 | Nordell | 248/517 |
| 3,586,274 A | 6/1971 | Hart | |
| 4,649,678 A * | 3/1987 | Lamson | 52/103 |
| 4,650,146 A | 3/1987 | Duke | |
| 4,854,069 A | 8/1989 | Smith et al. | |
| 4,866,873 A | 9/1989 | Van Valkenburg | |
| 5,122,014 A * | 6/1992 | Genfan | 405/244 |
| 5,359,803 A | 11/1994 | Shieh | |
| 5,400,996 A | 3/1995 | Drish | |
| 5,488,798 A * | 2/1996 | Beachel | 43/21.2 |
| 5,535,978 A * | 7/1996 | Rodriguez et al. | 248/530 |
| 5,915,942 A * | 6/1999 | Ratliffe | 43/21.2 |
| 6,678,991 B2 | 1/2004 | Hooks et al. | |
| 6,898,893 B1 | 5/2005 | Mukdaprakorn | |
| 7,159,354 B1 | 1/2007 | White | |
| 7,568,306 B1 * | 8/2009 | Rice, Sr. | 43/21.2 |
| 2005/0229471 A1* | 10/2005 | Willard | 43/21.2 |
| 2007/0011934 A1* | 1/2007 | Rayfield | 43/17 |
| 2007/0240367 A1* | 10/2007 | Brown | 52/155 |
| 2008/0115401 A1* | 5/2008 | Roemer et al. | 43/21.2 |
| 2008/0168698 A1* | 7/2008 | Bailey | 43/17 |
| 2009/0119969 A1* | 5/2009 | Cavanaugh | 43/21.2 |
| 2009/0145016 A1* | 6/2009 | Bateman | 43/21.2 |

\* cited by examiner

*Primary Examiner* — Christopher P Ellis
(74) *Attorney, Agent, or Firm* — Heslin Rothenberg Farley & Mesiti P.C.

(57) ABSTRACT

A fishing pole holder can be inserted into the ground into a variety of types of dirt, soil and sand, can receive and maintain the handle of a fishing pole, and be removed from the ground and easily transported when not in use. The fishing pole holder includes a first end having a receiving cavity configured to receive the stock of a fishing pole, and a second end having a plurality of teeth for insertion into the ground, so as to securely anchor the second end into the ground.

21 Claims, 9 Drawing Sheets

FISHING POLE HOLDER

FIELD OF THE INVENTION

The present invention relates generally to devices for fishing and more particularly to fishing pole holders that can be easily and temporarily inserted into the ground.

BACKGROUND OF THE INVENTION

One of the most important qualities a person fishing must possess, is patience. It is possible to cast your line and spend many minutes, if not hours, waiting for a fish to bite. After casting the fishing line and hook into the water, typically a person holds the fishing pole in his hand or hands while waiting for a fish to bite.

Because of the long time that a person is often required to wait before a fish bites, one often desires to fish with more than one fishing pole, which increases the chances of catching a fish. However, it is quite difficult, if not impossible, for a person to hold more than one fishing pole at the same time.

Also, because of the long time that a person is sometimes required to wait before a fish bites, often, the person will need or desire to perform other activities that require the use of both hands. Similarly, often when fishing, a person's hands will become tired from holding onto the fishing pole for an extended period of time, so that the person needs or desires to rest their hands while waiting for a fish to bite. However, placing a fishing pole on the ground while the fishing line and hook are in the water in order to perform other activities or rest one's hands is problematic. A fishing pole placed on the ground may be stepped on and damaged or accidentally washed into the water. An unattended fishing pole on the ground can also be dangerous, as it may cause a person to trip and fall. Another major disadvantage of placing your fishing pole on the ground, is that it becomes very difficult to tell if a fish is biting your line.

Ideally, in these situations where a person desires to use more than one fishing pole, perform other tasks requiring the use of both hands while fishing, or simply rest one's hands, the person will utilize a fishing pole holder. A fishing pole holder is a device that maintains the fishing pole in a vertical or semi-vertical position, in order to keep the pole off the ground and allow a person to see if a fish bites the hook. Whether fishing in a boat or on the shore, the fishing pole holder must be securely anchored to something in order to support the fishing pole in a vertical or semi-vertical position. Once the fishing pole holder is securely anchored, the fishing pole can be inserted into the fishing pole holder where it will remain in a vertical or semi-vertical position, without the use of a person's hand or hands.

In the case of shore fishing or surf fishing, one way to anchor the fishing pole holder so that it will support a fishing pole is to insert the fishing pole holder into the ground. When inserting the fishing pole holder into the ground in order to anchor it securely, one must be sure that the fishing pole holder is inserted to a sufficient depth. This can be difficult depending on the type of ground into which the fishing pole holder is being inserted. Also problematic, is securing a firm grip on the fishing pole holder so that a sufficient amount of pressure can be applied to the fishing pole holder to ensure insertion to a sufficient depth.

The composition of ground or shore surrounding a particular body of water can vary greatly. The ground may consist of soft sand, soft sand mixed with small shells or stones, soft or semi-hard dirt, soft or semi-hard dirt mixed with small stones, packed dirt, or packed dirt with small stones.

Finally, removal of the fishing pole holder from the ground can be a challenge due to the difficulty of obtaining a secure grip on the fishing pole holder. Once the fishing pole holder is removed from the ground, it is often wet, slippery and/or dirty, which makes carrying and transport of the fishing pole holder difficult.

Accordingly, there is a need for a fishing pole holder that can be easily and temporarily inserted into the ground into a variety of types of dirt, soil and sand, receive and maintain the stock of a fishing pole, and be easily removed from the ground and conveniently transported when not in use.

BRIEF SUMMARY OF INVENTION

An aspect of the present invention includes a fishing pole holder, which includes a body having a first end and a second end. The first end has a receiving cavity configured to receive a stock of a fishing pole. The second end has a plurality of teeth to allow for insertion of the second end into the ground.

A second aspect of the present invention includes a kit having a fishing pole holder, which includes a body having a first end, a second end and a third end. The first end has a receiving cavity configured to receive a stock of a fishing pole. The second end is releasably connectable to the first end, and has a first number of teeth to allow for insertion of the second end into the ground. The third end is releasably connectable to the first end, and has a second number of teeth to allow for insertion of the third end into the ground. The second number of teeth is different than the first number of teeth.

A third aspect of the present invention includes a method for using a fishing pole holder, which includes providing a body having a first end and a second end. The first end has a receiving cavity configured to receive a stock of a fishing pole. The second end is releasably connectable to the first end. The second end has a first number of teeth to allow for insertion of the second end into the ground. The fishing pole holder also has third end releasably connectable to the first end. The third end has a second number of teeth to allow for insertion of the third end into the ground. The second number of teeth is different than the first number of teeth. A user selects the second end or the third end. The user releasably connects the second end or the third end to the first end. The user then inserts the second end or the third end into the ground.

BRIEF DESCRIPTION OF THE DRAWINGS

These and other features, aspects and advantages of the present invention will become apparent from the following description of preferred embodiments, when read in conjunction with the accompanying drawings.

DETAILED DESCRIPTION OF THE INVENTION

The present invention includes a fishing pole holder that can be easily and temporarily inserted into the ground into a variety of types of dirt, soil and sand, receive and maintain the stock of a fishing pole, and be removed from the ground and conveniently transported when not in use.

Figure 1:
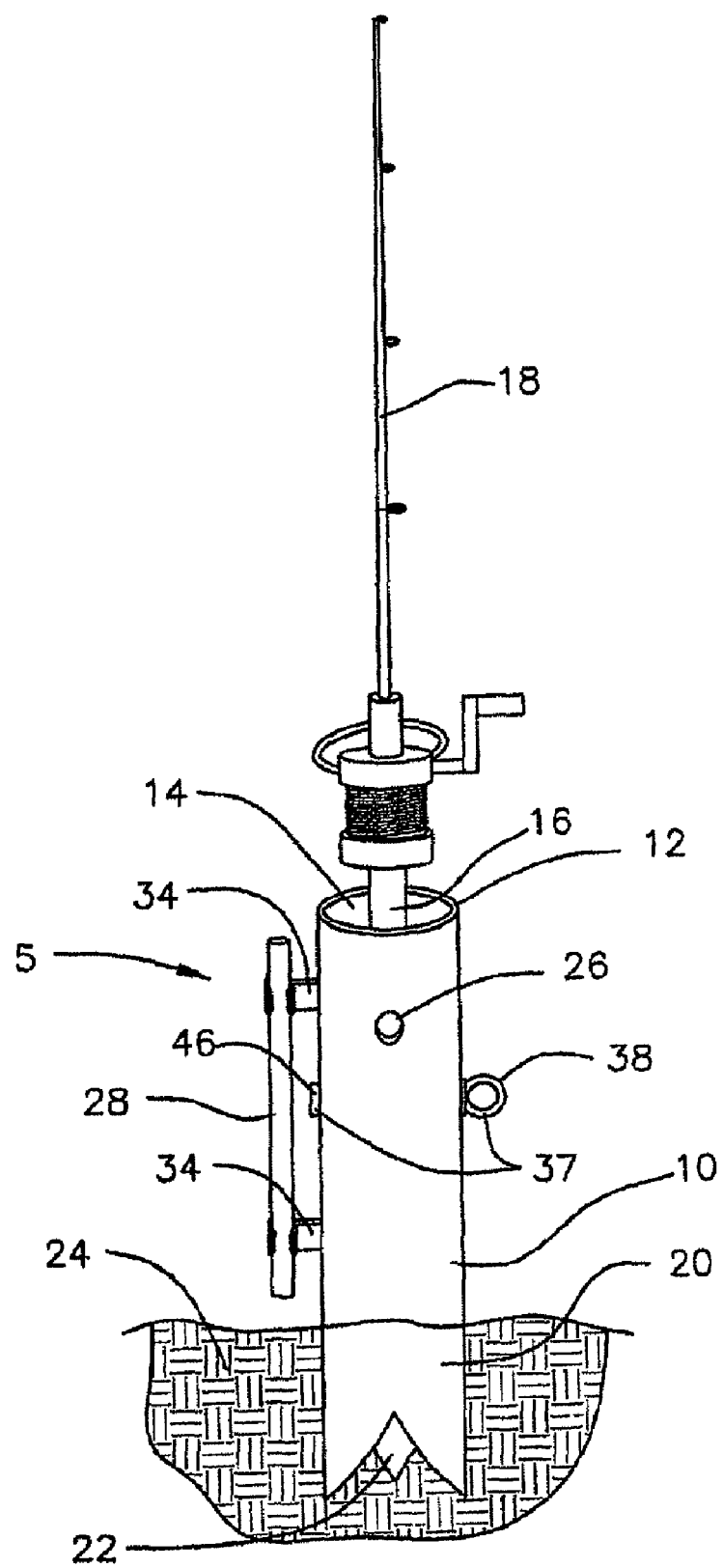
FIG. 1 is a perspective view of a fishing pole holder and fishing pole in accordance with the present invention.

Referring to FIG. 1, a fishing pole holder 5 includes a body 10 having a first end 12 and a second end 20. First end 12 has a receiving cavity 14 configured to receive a handle or stock 16 of a fishing pole 18. Second end 20 has teeth 22 to allow for insertion of second end 20 into the ground 24. The size, shape and diameter of receiving cavity 14 may vary in order to accommodate different types and sizes of fishing pole stocks (e.g., stock 16).

As depicted in FIG. 1, body 10 is a cylindrical tube. Body 10 may also be configured in various shapes, such as a square tube or triangular tube. Body 10 may be made of metal, plastic, wood, glass, polyvinyl chloride, combinations thereof, or any other material which can support a fishing pole in a vertical or semi-vertical position. Body 10 may be configured in various lengths and widths to accommodate different types and sizes of fishing poles. Body 10 may also be provided in various colors, some which make body 10 highly visible to the human eye. Teeth 22 on second end 20 facilitate insertion of second end 20 into the ground 24.

Second end 20 may have any number of teeth, depending on the type of ground fishing pole holder 5 is being inserted into. For example, second end 20 may have two teeth, three teeth, four teeth, five teeth, six teeth, etc. Teeth 22 may also be provided in different shapes, sizes and patterns. Teeth 22 may be v-shaped, circular-shaped, scalloped-shaped or square-shaped and may be spaced equally around the circumference of second end 20 of body 10. Teeth 22 may also alternate between various shapes. Teeth 22 may be arranged consecutively so that a first tooth connects directly to a second tooth such that there is no horizontal surface between the teeth (see e.g., teeth 122 (FIG. 3)). Teeth 22 may also be arranged so that there is a gap or gaps between teeth 22. A gap is a horizontal surface between teeth (see e.g., gap 62 between teeth 56, 58 (FIG. 12)).

Figure 3:
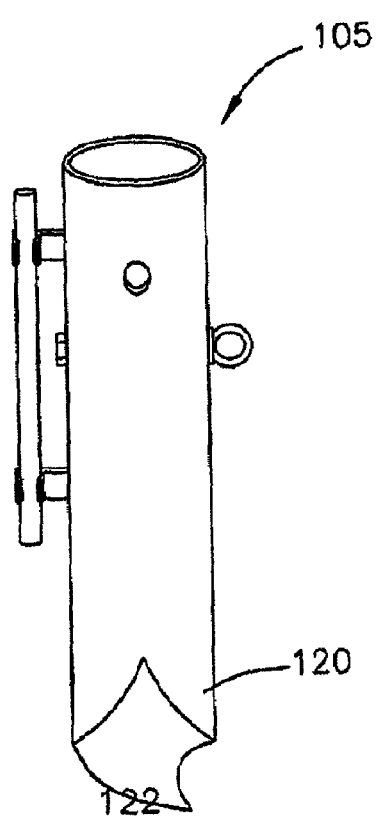
FIG. 3 is a perspective view of the fishing pole holder of FIG. 1 with the handle fastened to the body for transportation of the fishing pole holder when not in use in accordance with the present invention.
Figure 4:
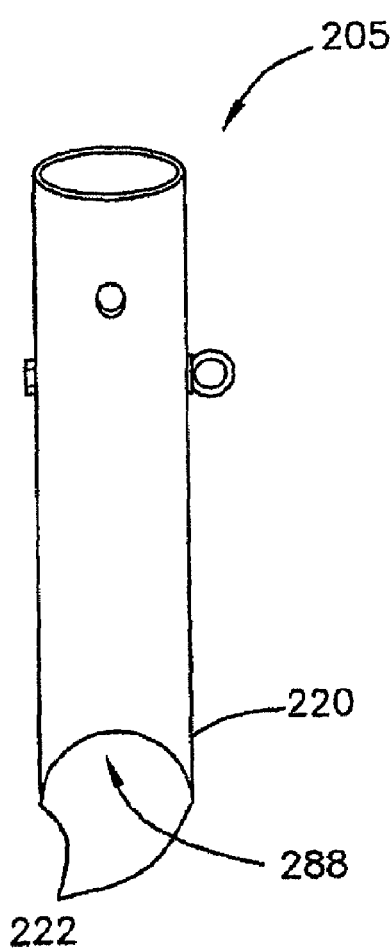
FIG. 4 is a perspective view of a fishing pole holder with a second end thereof having two teeth in accordance with the present invention.
Figure 5:
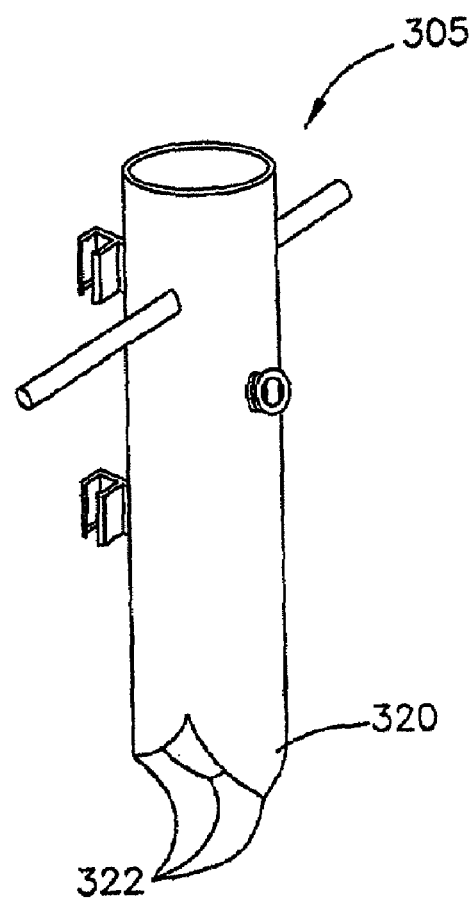
FIG. 5 is a perspective view of a fishing pole holder with a second end thereof having three teeth in accordance with another aspect of the present invention.
Figure 6:
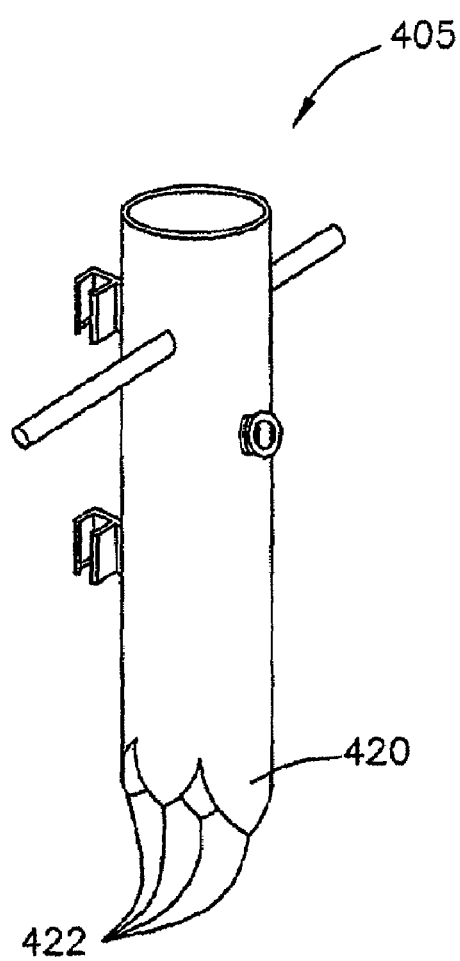
FIG. 6. is a perspective view of a fishing pole holder with a second end thereof having four teeth in accordance with a further aspect the present invention.
Figure 7:
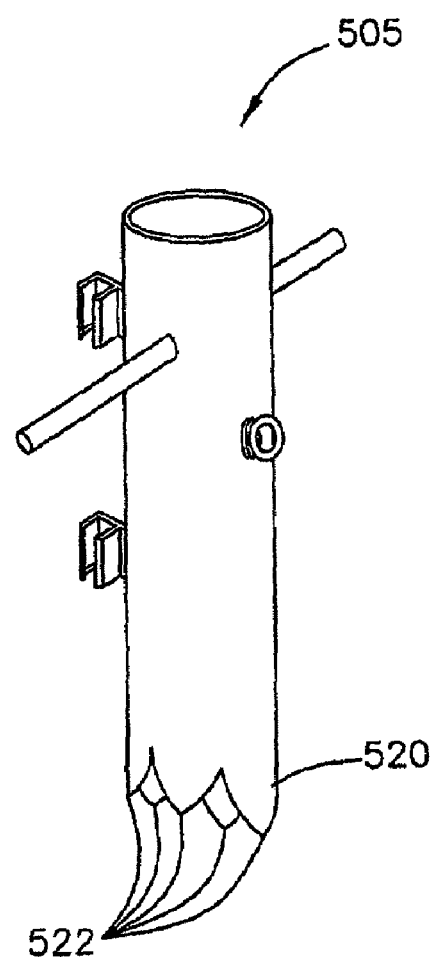
FIG. 7 is a perspective view of a fishing pole holder with a second end thereof having five teeth in accordance with yet another aspect of the present invention.

As depicted in FIG. 3, a second end 120 of a fishing pole holder 105 with two teeth 122 is particularly useful for insertion into soft sand. Turning to FIG. 4, a second end 220 of a fishing pole holder 205 includes two teeth 222, where a surface 288 between two teeth 222 is curved, rather than horizontal, triangular or square. Turning to FIG. 5, a second end 320 of a fishing pole holder 305 with three teeth 322 is particularly useful for insertion into soft sand mixed with small shells or stones. Teeth 322 are arranged consecutively such that the space (i.e., connecting portion or surface of end 320 between teeth 322) between the teeth forms an inverted v-shape. Turning to FIG. 6, a second end 420 of a fishing pole holder 405 has four teeth 422, which is particularly useful for insertion into soft dirt or semi-hard dirt that may be mixed with small stones. Turning to FIG. 7, a second end 520 of a fishing pole holder 505 has five teeth 522. A second end 520 of fishing pole holder 505 with five teeth 522 or six teeth is particularly useful for insertion into packed dirt with or without small stones.

Figure 11:
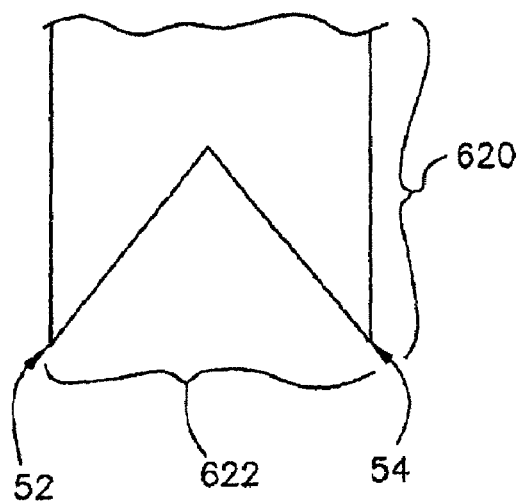
FIG. 11 is an enlarged side view of a portion of the second end of a fishing pole holder in accordance with the present invention.

As shown in FIG. 11, a second end 620 with teeth 622 has two v-shaped teeth 52, 54 arranged consecutively so that there is no gap (i.e., horizontal surface) between teeth (e.g., teeth 52, 54).

Figure 12:
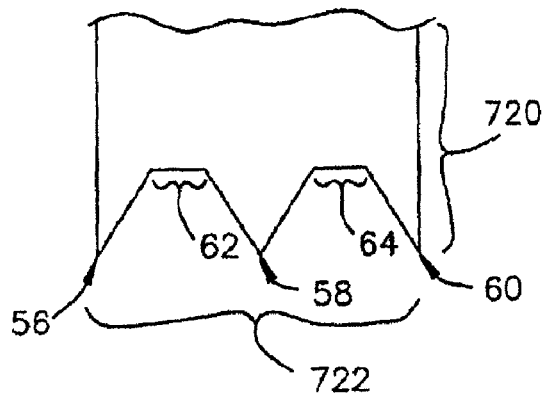
FIG. 12 is an enlarged side view of a portion of a second end of a fishing pole holder in accordance with another aspect of the present invention.

As shown in FIG. 12, a second end 720 with teeth 722 has three v-shaped teeth 56, 58, 60 arranged non-consecutively so that there is a first gap (i.e., horizontal surface) 62 between teeth 56, 58 and a second gap 64 between teeth 58, 60.

Figure 13:
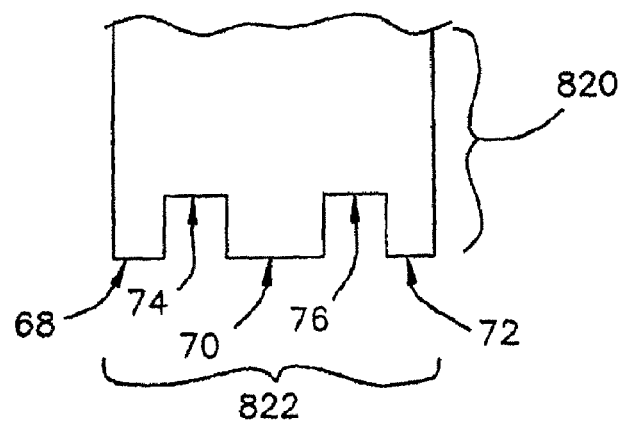
FIG. 13 is an enlarged side view of a portion of a second end of a fishing pole holder in accordance with a further aspect of the present invention.

As shown in FIG. 13, a second end 820 with teeth 822 has three square-shaped teeth 68, 70, 72 arranged non-consecutively so that there is a first gap (i.e., horizontal surface) 74 between teeth 68, 70 and a second gap 76 between teeth 70, 72.

Figure 14:
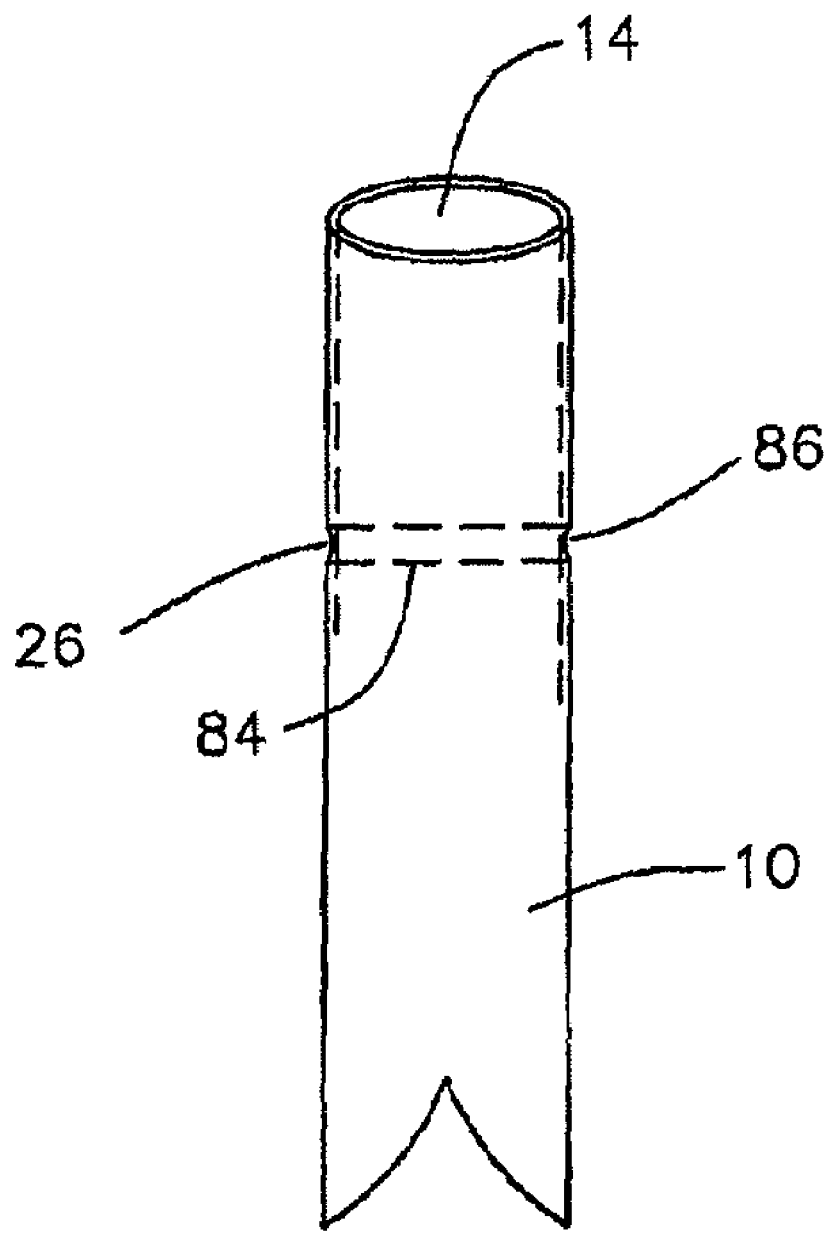
FIG. 14 is a perspective view of a fishing pole holder in accordance with yet a further aspect of the present invention.

As shown in FIG. 14, a first opening 26 and a second opening 86 may be located on opposite sides of body 10. Openings 26, 86 may be arranged substantially perpendicular to a longitudinal dimension of body 10. For example, openings 26, 86 may be circular and axes of openings 26, 86 may be aligned substantially perpendicular to the longitudinal dimension of body 10. As another example, body 10 may be a cylinder and axes of body 10 may be substantially perpendicular to axes of openings 26, 86. Openings 26, 86 are arranged so that there is a cavity 84 between openings 26, 86. Such a cavity (i.e., cavity 84) may be a portion of receiving cavity 14. A handle 28 (FIG. 2) may be inserted into cavity 84, and may be formed of different lengths according to desired use or preferences of user. Handle 28 (FIG. 2) may be plastic, metal, wood or polyvinyl chloride and may be formed in a variety of shapes, including flat or cylindrical.

Referring back to FIG. 2, handle 28 is long enough so that when inserted into openings 26, 86 (FIG. 14), a first portion 30 of handle 28 and a second portion 32 of handle 28 will protrude from openings 26, 86 (FIG. 14) on each side of fishing pole holder 5, with first portion 30 and second portion 32 long enough for a human hand to grip first portion 30 and/or second portion 32 on each side of fishing pole holder 5 to allow sufficient force to be applied so as to insert second end 20 of fishing pole holder 5 into the ground 24 as in FIG. 1. For example, to insert second end 20 of fishing pole holder 5 into the ground, a person may place fishing pole holder 5 on the ground, grip one or both of first portion 30 and second portion 32 and either apply downward force towards the ground 24 (FIG. 1), or apply downward force towards the ground 24 (FIG. 1) while optionally rotating fishing pole holder 5 to accomplish a digging, drilling, burrowing, or boring effect, thereby penetrating the ground with second end 20. The second end 20 may be inserted into the ground 24 (FIG. 1) far enough such that fishing pole holder 5 supports the weight of fishing pole 18 (FIG. 1) while inhibiting a top end of fishing pole holder 5 from tipping over so as to maintain fishing pole 18 (FIG. 1) in a vertical or semi-vertical position.

Turning again to FIG. 1, fishing pole holder 5 may contain one or more clips 34 to secure handle 28 to body 10 of fishing pole holder 5 when handle 28 is not in use. Clips 34 extend outward from body 10 and are arranged parallel to a longitudinal dimension of body 10. Clips 34 may be any device or fastener that releasably connects handle 28 to fishing pole holder 5 such that handle 28 may be used to carry fishing pole holder 5 when attached thereto. Clip 34 may be a spring clip, broom clip, clasp, clamp, or latch. As shown in FIG. 1, there are two clips 34 arranged substantially perpendicular to a horizontal axis of body 10 to secure handle 28 to body 10 of fishing pole holder 5. In a preferred embodiment, handle 28 may be releasably connected to body 10 using clips 34 and thereby conveniently stored when not in use. When handle 28 is releasably connected to body 10 using clips 34, handle 28 may be also used to carry or transport fishing pole holder 5 when fishing pole holder 5 is not in use. For example, a user may grip handle 28 while fishing pole holder 5 is attached thereto to allow the user to carry both handle 28 and fishing pole holder 5.

Fishing pole holder 5 may contain a supporting member 37 to support a weight of fishing pole 18 and to inhibit stock 16 of fishing pole 18 from moving further (e.g., by gravity) into receiving cavity 14 in a downward direction toward second end 20 as depicted in FIG. 1. Supporting member 37 may inhibit reel 80 (FIG. 10) of fishing pole 18 from contacting body 10 of fishing pole holder 5 and interfering with the rotation of a reel handle 44 (FIG. 10) of fishing pole 18 by inhibiting stock 16 of fishing pole 18 from moving further (e.g., by gravity) into receiving cavity 14 in a direction toward second end 20. For example, supporting member 37 may inhibit reel 80 (FIG. 10) from moving in a downward direction toward second end 20, further inhibiting reel 80 (FIG. 10) from contacting body 10, such that reel handle 44 (FIG. 10) can rotate freely (e.g., when a fish bites the line) without contacting body 10. Supporting member 37 may be inserted horizontally (i.e., substantially perpendicular to a longitudinal dimension of body 10) through receiving cavity 14 and through openings (not shown) in body 10. As shown, a first end 38 and a second end 46 of supporting member 37 protrude from receiving cavity 14. In a preferred embodiment, first end 38 of supporting member 37 is a closed loop. First end 38 of supporting member may also be a hook, clasp, clamp or other means for allowing objects to be connected thereto. In another example, first end 38 of supporting member 37 may be an eye bolt connected to second end 46 of supporting member 37, which may be a nut.

Figures 8, 9:
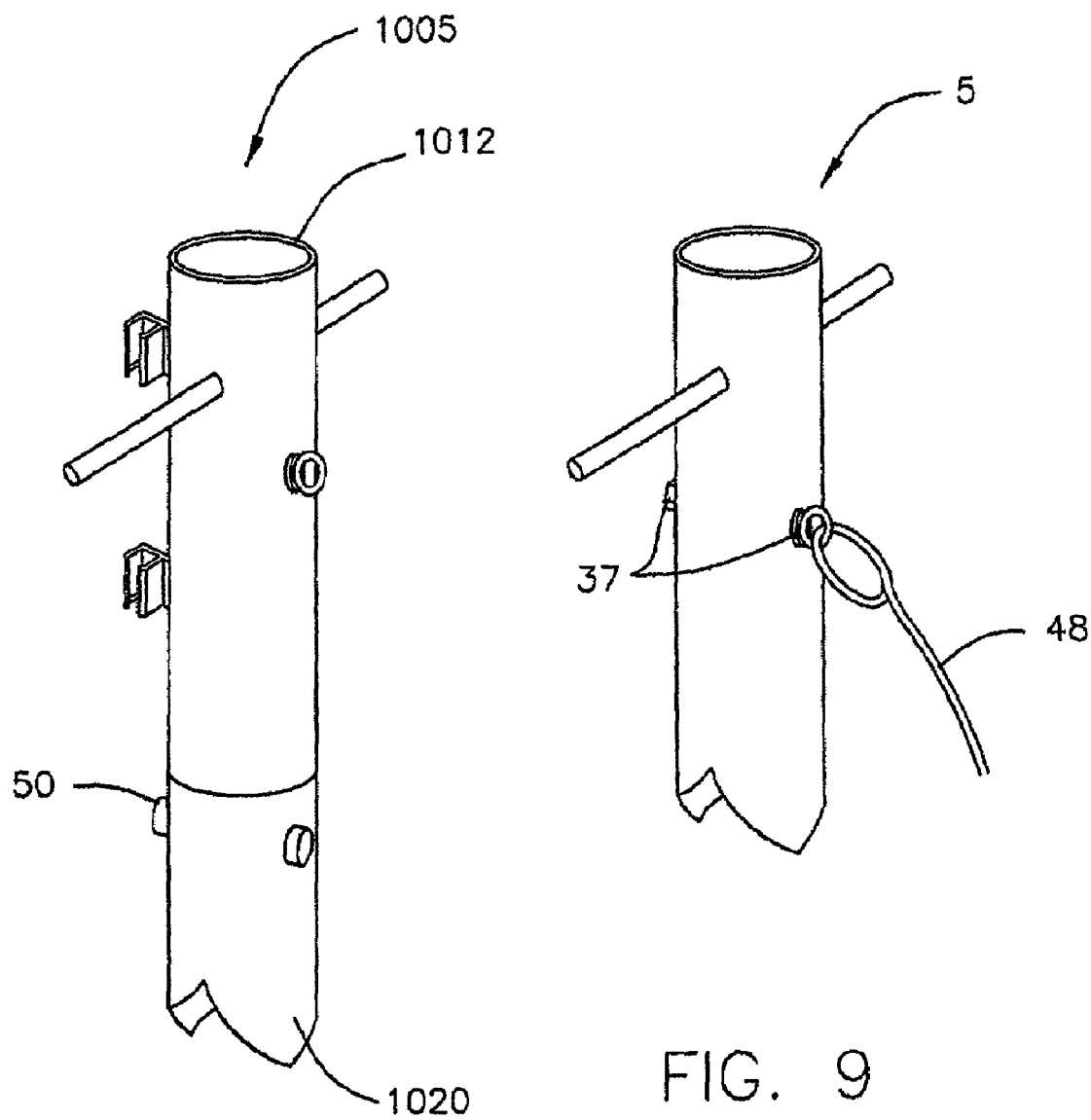
FIG. 8 is a perspective view of a fishing pole holder with a detachable second end being secured to a first end by a fastening mechanism in accordance with yet a further aspect of the present invention.
FIG. 9 is a perspective view of the fishing pole holder of FIG. 1 with a stringer for fish attached thereto in accordance with the present invention.
Figure 15:
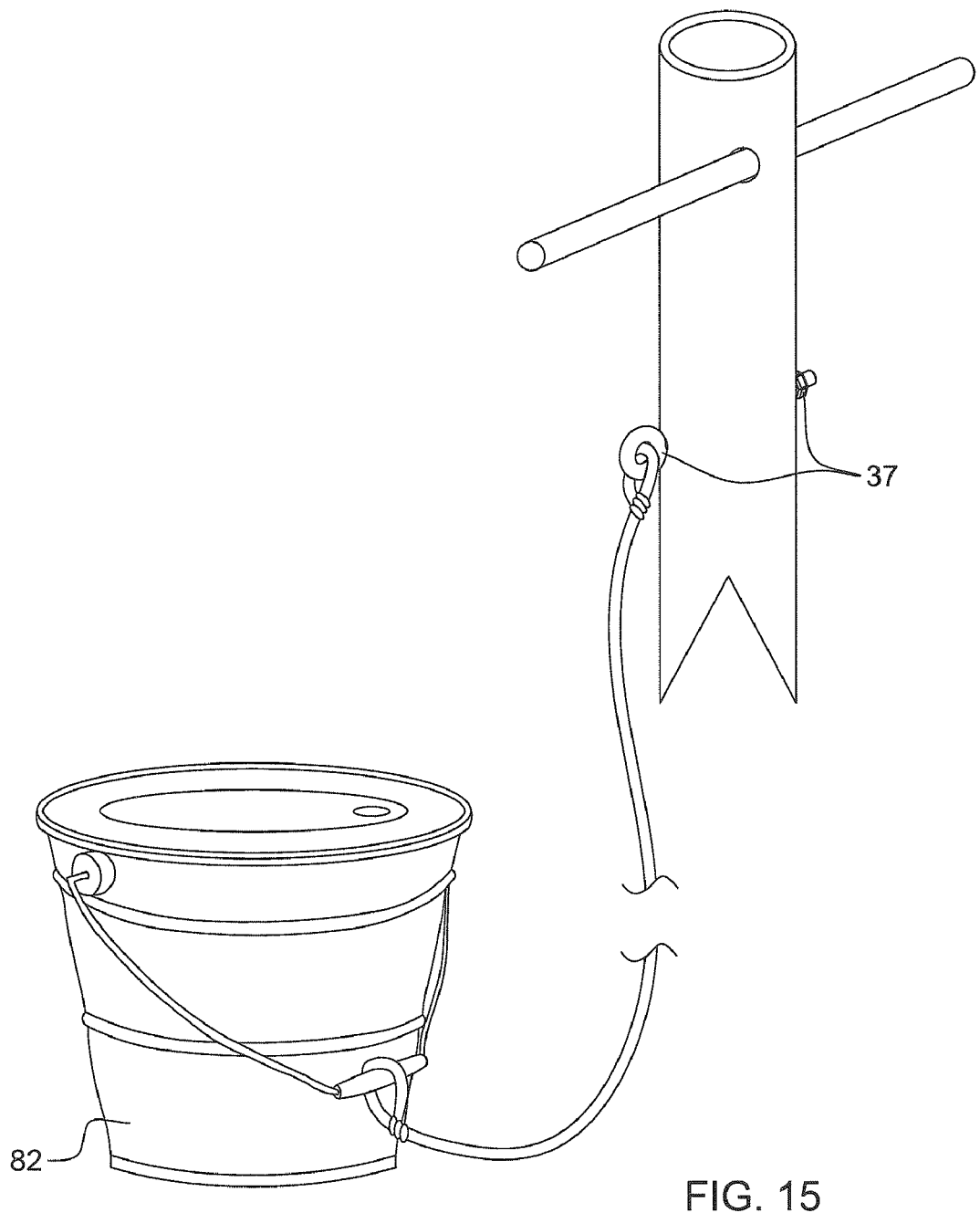
FIG. 15 is a perspective view of the fishing pole holder of FIG. 1 with a bait bucket attached thereto in accordance with the present invention.

As shown in FIG. 9, supporting member 37 may be connectable to a bait bucket or a stringer 48 for holding fish. Stringer 48 may be connectable to supporting member 37 so that a user can attach fish to stringer 48 to prevent the fish from escaping, place stringer 48 in the water in order to keep the fish alive, and connect stringer 48 to supporting member 37 to inhibit stringer 48 from floating away. Similarly, as shown in FIG. 15, a bait bucket 82 may be connectable to supporting member 37 so that a bait bucket with live bait may be placed in the water so that the bait will remain alive but the bait bucket will not float away. Other objects may also be connectable to supporting member 37, such as a dog's leash or chum bag. A dog's leash may be connectable to supporting member 37 in order to inhibit dog from escaping or running away. A chum bag may be connectable to supporting member 37 so that the chum bag may be placed in the water to attract fish without floating away. It will be understood by one skilled in the art that fishing pole holder 5 may be inserted into ground that may be moist or at least partially submerged in water.

Figure 10:
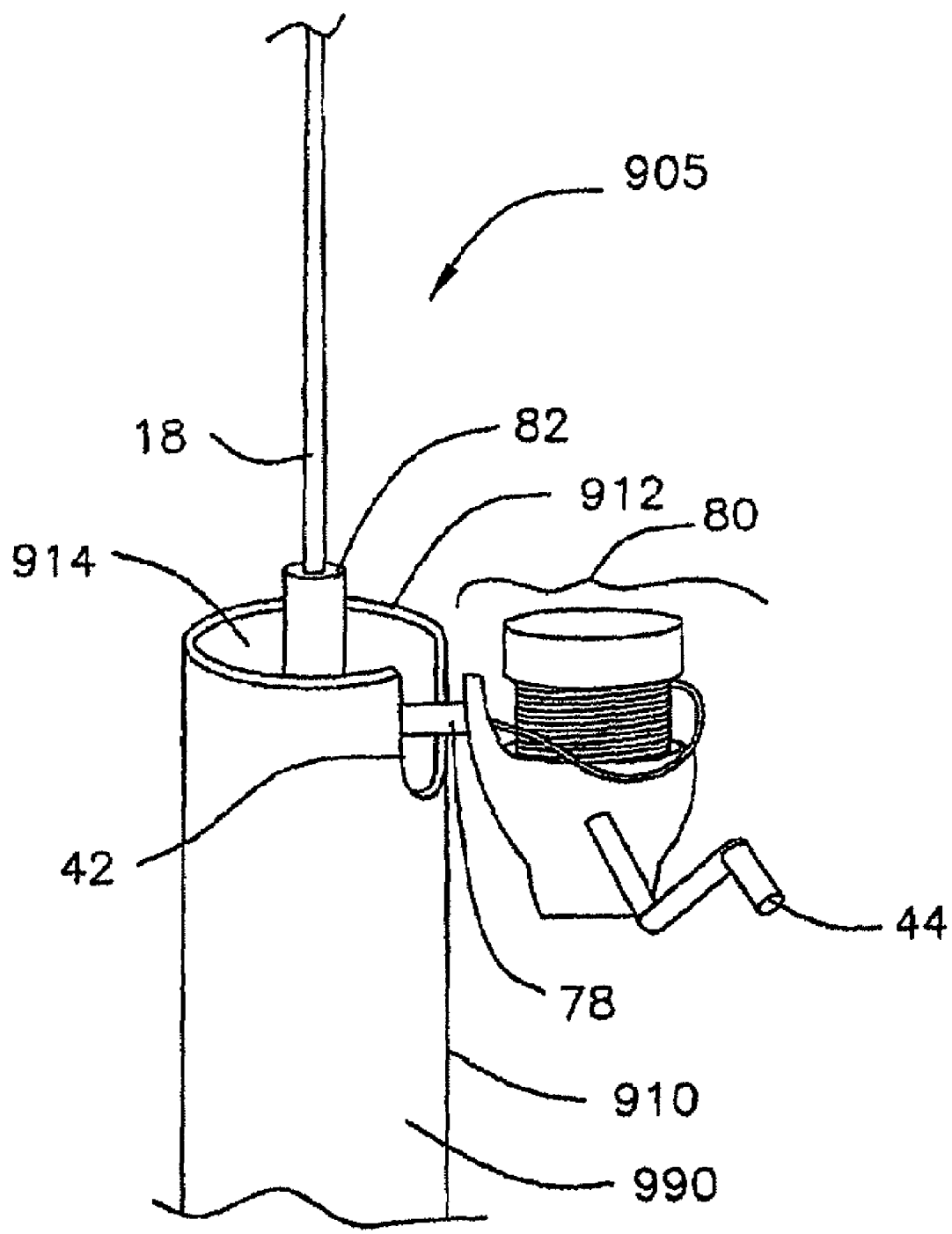
FIG. 10 is a perspective view of a fishing pole holder having a notch to receive a reel of a fishing pole in accordance with an aspect of the present invention.

As depicted in another embodiment, FIG. 10, a fishing pole holder 905, includes a first end 912 of a body 910 having a notch 42 configured to receive a reel connecting member 78 of reel 80 of fishing pole 18 such that reel connecting member 78 may pass through notch 42 and/or be supported by resting on a portion of notch 42. Reel connecting member 78 may be of sufficient length such that reel connecting member 78 passes through notch 42 such that reel 80 is at a sufficient distance from an outer surface 990 of body 910 to allow rotation of reel handle 44 relative to body 910. When reel supporting member 78 is received in notch 42 and/or resting on a portion of notch 42, notch 42 may inhibit movement of fishing pole 18 relative to body 910. For example, when reel supporting member 78 is received in notch 42 and/or resting on a portion of notch 42, notch 42 may inhibit movement of fishing pole 18 in a circumferential direction relative to body 910. Notch 42 may be any indentation in first end 912 that allows reel handle 44 of fishing pole 18 to extend there through and allow reel handle 44 to rotate without contacting an exterior surface of body 910. Notch 42 is sufficiently wide enough to receive reel supporting member 78 of reel 80 of fishing pole 18. Notch 42 may be a variety of sizes and shapes, including arced shaped, elliptically shaped, circularly shaped, and square-shaped. For example, if fishing pole 18 is in receiving cavity 914 and reel supporting member 78 is received in notch 42, reel handle 44 may rotate in response to a fish pulling on the end of the fishing line.

As shown in FIG. 8, in another embodiment of a fishing pole holder 1005, a first end 1012 and a second end 1020 may be releasably connected to one another in a variety of ways. For example, first end 1012 may be configured so that it fits into second end 1020, or second end 1020 may be configured to fit into first end 1012. First end 1012 may have exterior threads releasably connectable to interior threads on second end 1020, or vice versa. First end 1012 and second end 1020 may also be releasably connected to one another by a bolt 50 or other fastening mechanism received in openings (not shown) of both ends when first end 1012 is inserted into second end 1020, or vice versa. First end 1012 and second end 1020 may be made from different materials that have differing characteristics, such as differing strengths or differing flexibilities. First end 1012 and second end 1020 may be formed of metal, plastic, wood, glass, or polyvinyl chloride. For example, first end 1012 may be made of polyvinyl chloride, while second end 1020 may be made of metal.

In another example, a fishing pole holder kit may include a first end and more than one second end, each second end having a plurality of teeth. The first end and any one of second ends may be releasably connected to one another. For example, a first end 1012 depicted in FIG. 8 may also be connectable to one or more second ends having the connectors (e.g., threads) of second end 1020, but which may have different numbers and types of teeth similar to the second ends 120, 220, 320, 420, 520, 620, 720, 820 depicted in FIGS. 3-7, 11-13 and described above.

In one example, a user may utilize fishing pole holder 5 (FIG. 1) by inserting handle 28 (FIG. 1) into openings 26, 86

Figure 2:
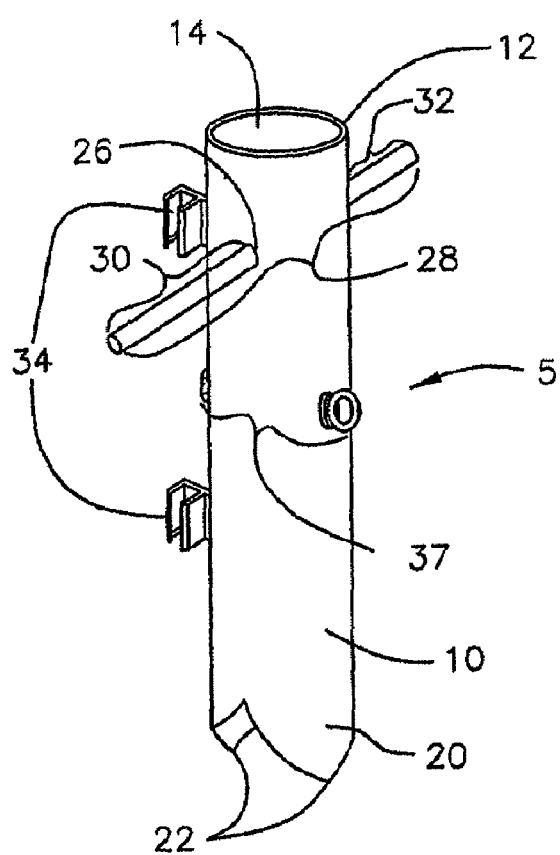
FIG. 2 is a perspective view of the fishing pole holder of FIG. 1 without a fishing pole.

(FIG. 14) and griping one or both of first portion 30 and second portion 32 (FIG. 2). The user then either applies downward force to one or both of first portion 30 and second portion 32 towards the ground 24 (FIG. 1), or applies downward force to one or both of first portion 30 and second portion 32 (FIG. 2) towards the ground 24 (FIG. 1) while optionally rotating fishing pole holder 5 to accomplish a digging, drilling, burrowing, or boring effect, thereby penetrating the ground with second end 20. The user may then remove handle 28 from openings 26, 86 (FIG. 14) and connect handle 28 (FIG. 1) to clips 34, such that handle 28 is securely attached to body 10. The user may then place fishing rod 18 into receiving cavity 14. The user also has the option of attaching stringer for fish 48 (FIG. 9), a bait bucket, a dog's leash or other object to first end 38 (FIG. 1) of supporting member 37. When the user is done fishing, he or she can remove fishing pole 18 from fishing pole holder 5 and remove fishing pole holder 5 from the ground, using handle 28 inserted in openings 26, 86, (FIG. 14) if necessary. For example, the user may remove fishing pole holder 5 (FIG. 1) from the ground 24 by griping one or both of first portion 30 and second portion 32 (FIG. 2) of handle 28 and applying upward pressure, with rotation of fishing pole holder 5 being optional. The user may then carry and transport fishing pole holder 5 using handle 28 when handle 28 is connected to body 10 by clips 34 (FIG. 1).

In another example, to utilize fishing pole holder 1005 (FIG. 8), a user first selects a second end 1020 with the appropriate number and types of teeth (e.g., one of second ends 120, 220, 320, 420, 520, 620, 720, 820 depicted in FIGS. 3-7, 11-13 and described above) and formed of an appropriate material suitable for use in the type of ground where the user intends to use fishing pole holder 1005. The user then releasably connects the selected second end 1020 to first end 1012, using either exterior threads on first end 1012 connectable to interior threads on second end 1020, or vice versa. The user may also releasably connect first end 1012 to second end 1020 using a bolt 50 or other fastening mechanism received in openings (not shown) of first end 1012 and second end 1020 when first end 1012 is inserted into second end 1020, or vice versa. After the user has releasably connected first end 1012 and second end 1020, he or she may utilize fishing pole holder 1005 the same way a user would use fishing pole holder 5 (FIG. 1), as described above. However, if the user wishes to move fishing pole holder 1005 to a different location with a different type of ground, the user may remove the previously selected second end 1020 from first end 1012 and replace it with a second end 1020 with the appropriate number and types of teeth (e.g., one of second ends 120, 220, 320, 420, 520, 620, 720, 820 depicted in FIGS. 3-7, 11-13 and described above) and formed of an appropriate material suitable for use in the type of ground where the user intends to use fishing pole holder 1005.

It is understood by one skilled in the art that a fishing pole holder (e.g., 5, 105, 205, 305, 405, 505, 905, 1005) as described above may have a variety of second ends (e.g., 120, 220, 320, 420, 520, 620, 720, 820, 1020) having multiple teeth (e.g., 122, 222, 322, 422, 522, 622, 722, 822) which allow fishing pole holder 5 (e.g. 105, 205, 305, 405, 505, 905, 1005) to be used in a variety of types of ground, such that second ends may be connected to first ends (e.g., 12) described above, or second ends may be releasably connected to first ends as described above.

Throughout the specification the terms and substituents are defined when first introduced and retain their definitions.

Although preferred embodiments have been described and depicted herein, it will be readily apparent to those skilled in this art, that various modifications, substitutions and changes can be made without departing from the scope of this invention, as defined by the appended claims.

The invention claimed is:

1. A fishing pole holder comprising:
a body having a first end and a second end;
said first end having a receiving cavity configured to receive a stock of a fishing pole; and
said second end having a plurality of teeth to allow for insertion of said second end into the ground, wherein the plurality of teeth extend in a direction towards the second end of the body and away from the first end of the body.

2. The fishing pole holder of claim 1, further comprising a plurality of openings having an axis arranged substantially perpendicular to a longitudinal dimension of said body.

3. The fishing pole holder of claim 2, further comprising a handle inserted into said plurality of openings such that a portion of the handle protrudes from said body allowing for the application of force to said handle by a user.

4. The fishing pole holder of claim 1, further comprising a supporting member configured to support a weight of the fishing pole and configured to inhibit the stock of the fishing pole from moving past said supporting member into said receiving cavity in a direction toward said second end.

5. The fishing pole holder of claim 4, wherein said supporting member comprises a loop extending away from said body.

6. The fishing pole holder of claim 4, further comprising a stringer for fish connected to said supporting member.

7. The fishing pole holder of claim 4, further comprising a bait bucket connected to said supporting member.

8. The fishing pole holder of claim 1, wherein said body is brightly colored so as to be plainly visible to the human eye.

9. The fishing pole holder of claim 1, wherein said plurality of teeth comprises six teeth or less.

10. The fishing pole holder of claim 1, wherein said plurality of teeth comprises two teeth for use in soft sand.

11. The fishing pole holder of claim 1, wherein said plurality of teeth comprises three teeth for use in soft sand mixed with small rocks or shells.

12. The fishing pole holder of claim 1, wherein said plurality of teeth comprises four teeth for use in soft to semi-hard dirt containing small rocks or shells.

13. The fishing pole holder of claim 1, wherein said plurality of teeth comprises six teeth for use in hard dirt containing small rocks.

14. The fishing pole holder of claim 1, wherein said first end contains a notch configured to receive at least a portion of the reel of the fishing pole and to allow rotation of the handle of the reel of the fishing pole relative to the body when at least a portion of the reel is received in said notch.

15. The fishing pole holder of claim 14, wherein said notch inhibits movement of the fishing pole in a circumferential direction relative to said body when at least a portion of the reel is received in said notch.

16. The fishing pole holder of claim 14, wherein said notch is arc-shaped.

17. The fishing pole holder of claim 1, wherein said body is formed of at least one of metal, plastic, and polyvinyl chloride.

18. The fishing pole holder of claim 1, wherein said second end of said body is releasably connectable to said first end.

19. The fishing pole holder of claim 18, wherein said first end comprises a first material different than a second material comprising said second end.

20. A fishing pole holder comprising:
a body having a first end and a second end;

said first end having a receiving cavity configured to receive a stock of a fishing pole;

said second end having a plurality of teeth to allow for insertion of said second end into the ground, wherein the plurality of teeth extend in a direction towards the second end of the body and away from the first end of the body;

a plurality of openings having an axis arranged substantially perpendicular to a longitudinal dimension of said body;

a handle inserted into said plurality of openings such that a portion of the handle protrudes from said body allowing for the application of force to said handle by a user; and said body having at least one clip, said clip being connectable to said handle.

21. The fishing pole holder of claim 1, wherein the plurality of teeth are arranged substantially parallel to a longitudinal dimension of said body.

\* \* \* \* \*